Aug. 7, 1923.

M. E. WIDELL ET AL 1,463,915

GASKET LINING MACHINE

Filed Feb. 28, 1921 7 Sheets-Sheet 1

Fig-1

Inventor
Magnus E. Widell
Warren A. Smith
By: Munday, Clarke & Carpenter Attys

Aug. 7, 1923.

M. E. WIDELL ET AL

1,463,915

GASKET LINING MACHINE

Filed Feb. 28, 1921

Patented Aug. 7, 1923.

1,463,915

UNITED STATES PATENT OFFICE.

MAGNUS E. WIDELL, OF MAYWOOD, AND WARREN A. SMITH, OF GENEVA, ILLINOIS, ASSIGNORS TO AMERICAN CAN COMPANY, OF NEW YORK, N. Y., A CORPORATION OF NEW JERSEY.

GASKET-LINING MACHINE.

Application filed February 28, 1921. Serial No. 448,625.

*To all whom it may concern:*

Be it known that we, MAGNUS E. WIDELL and WARREN A. SMITH, citizens of the United States, residing in Maywood and Geneva, respectively, in the counties of Cook and Kane, respectively, and State of Illinois, have invented a new and useful Improvement in Gasket-Lining Machines, of which the following is a specification.

This invention relates in general to machines for lining can ends with fiber gaskets and has more particular reference to certain improvements and features of construction whereby ends of different irregular shapes and sizes may be lined by a single machine through simple changes of a few parts and without altering the general construction of the machine.

Heretofore, it has been a common practice to provide different gasket lining machines for the various irregular types of ends to be lined, the die parts being fixed and arranged for ends of but one configuration. It is a principal object of the present invention to provide a machine for the purpose stated wherein the die and other parts, which must conform to the configuration of the ends to be lined, may be removed and others of different shape or size substituted.

A further object of the invention is the provision of a gasket lining machine of improved general construction and efficiency which is wholly automatic in its action and which consists of a minimum number of delicate parts likely to require frequent repair or replacement.

Still another object of the invention is the provision, in combination with other features of the machine, of novel coacting feeding devices whereby the can ends and the blanks from which the gaskets are to be cut are fed to an intermittently rotating turret in properly timed relation.

Numerous other objects and advantages of the invention will be apparent as it is better understood from the following description when considered in connection with the accompanying drawings illustrating a preferred embodiment thereof.

Referring to the drawings.

On the drawings we have shown an organized machine embodying our invention and, while in the form thereby illustrated the machine is arranged for lining can ends of a particular shape, it will be manifest that it might be arranged for lining any other type of can ends, the invention being in no sense limited to any particular shape, but on the other hand, as heretofore stated, contemplating the interchangeability of die parts to accommodate ends of different shapes and sizes.

It will be noted that the machine rests upon a base 11 and is supported generally by two side frame members 12 and 13.

Figure 6:
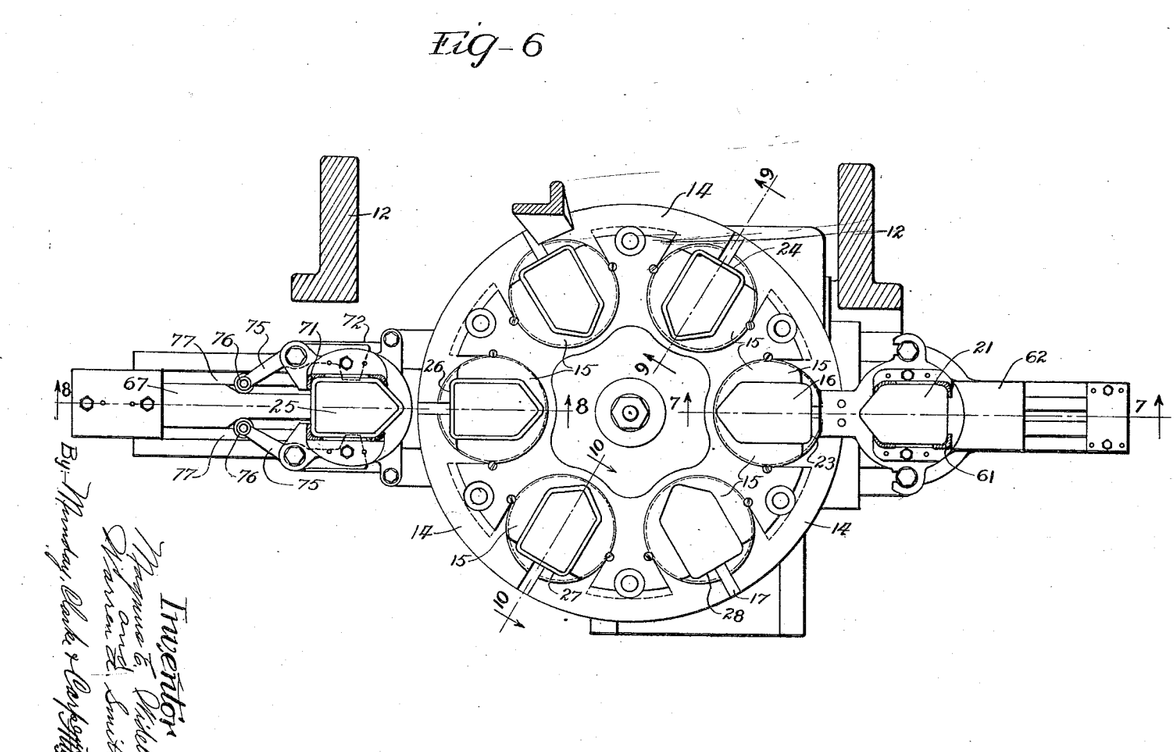
Fig. 6 is a section taken substantially on the line 6—6 in Figure 1.
Figure 7:
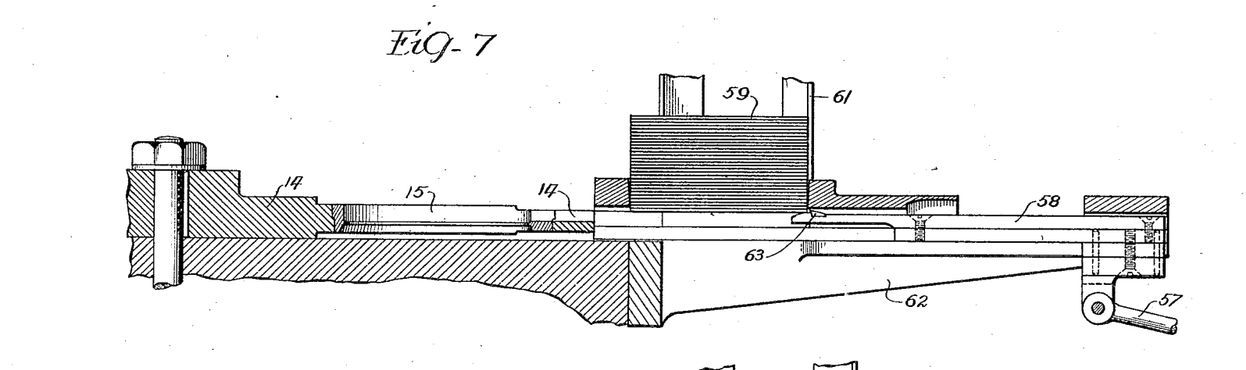
Fig. 7 is an enlarged section taken substantially on the line 7—7 of Fig. 6.
Figure 11:
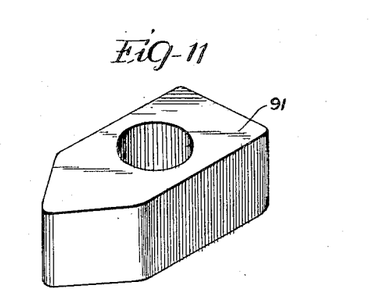
Figs. 11, 11$^a$ and 11$^b$ show enlarged schematic views of seating die, holder and base members.
Figure 11A:
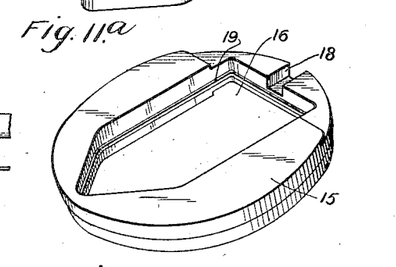

In order that the performance of the machine may be fully understood, attention is first directed to Figs. 6 and 11. A carrier turret 14 is provided with a plurality of holders 15 having apertures 16 therein of the size and shape of the ends to be lined, and being seated in the turret and secured by slides 17 taking into slots 18. Extending around the wall of the aperture 16 is a ledge 19 upon which the paper blank 21, from which the gasket is to be cut, is seated. These blanks are fed into the holders at the point indicated by reference numeral 23 and the cores are stamped out at 24, the can ends 25 being fed into the lower part of the holders 15 at the station indicated by the numeral 26, the gasket seated thereon at 27 and the lined ends ejected at 28, all as will be hereinafter more particularly described.

Figure 1:
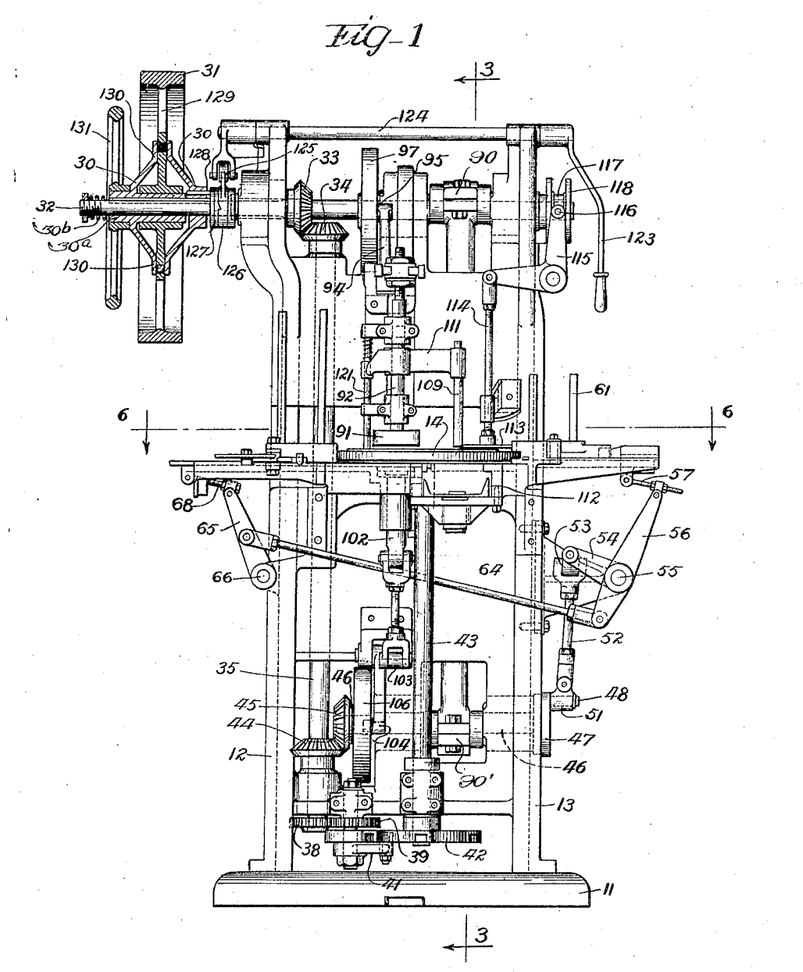
Figure 1 is a front elevation of the machine, certain parts being shown in section.
Figure 2:
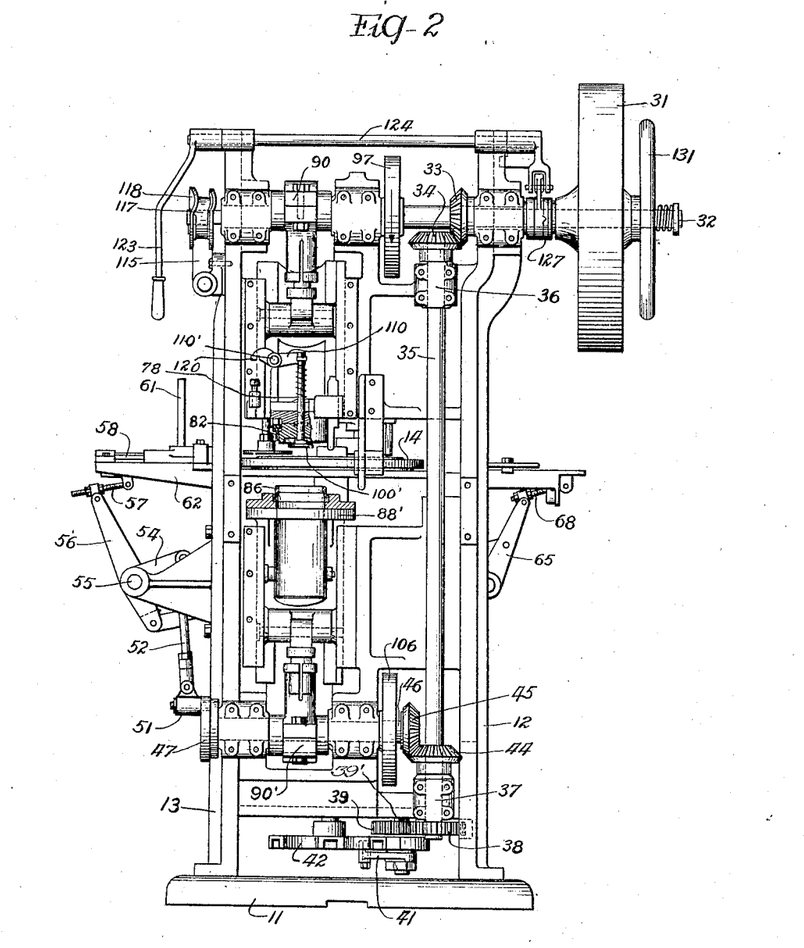
Fig. 2 is a rear elevation of same.
Figure 3:
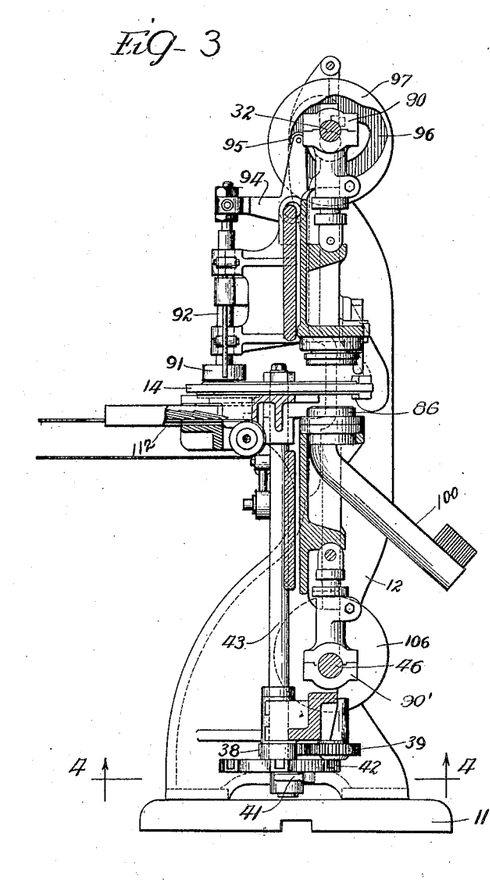
Fig. 3 is a section taken substantially on the line 3—3 of Figure 1.
Figure 4:
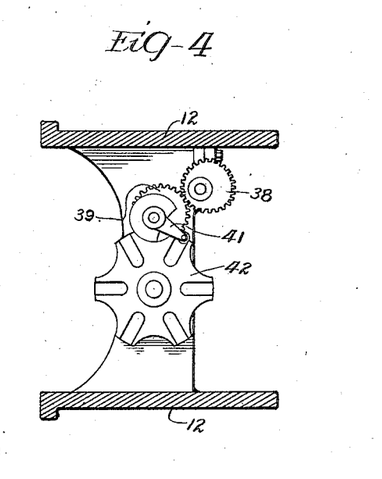
Fig. 4 is a section taken substantially on the line 4—4 of Fig. 3.

Referring now to Figs. 1 and 2, the mechanical operation may be observed. Power is taken in from a pulley wheel 31, driven in the usual way, and driving a shaft 32 when engaged by members 30 splined thereon. The web of the wheel 31 is pressed against said members 30 by outer members 130 mounted on the shaft by means of a sleeve 30$^a$ which is pressed inward by a spring 30$^b$. The shaft 32 carries a bevel gear 33 meshing with a second bevel gear 34 carried on a vertical shaft 35, which has bearings at 36 and 37 in the framework of the machine. At its lower end the shaft 35 carries a gear 38 meshing with a gear 39, these gears being arranged off-center with reference to their shafts 35 and 39' and the latter shaft, carrying also an actuator 41 of a Geneva movement, the wheel 42 of which drives a shaft 43 upon which the turret 14 is carried. In this manner, the turret is given intermittent movement, the purpose of which will presently appear.

The shaft 35 also carries a bevel gear 44 meshing with a similar gear 45 on a shaft 46 which carries at its opposite end a crank disc 47. A crank pin 48 is secured to this disc and is held in a wrist 51 to which is secured a link 52 which connects by means of a universal joint 53 with an arm 54 fast on a stub shaft 55, a rocker arm 56 being fast on the same shaft. This arm has an adjustable connection 57 with a sliding blank feed 58, which is actuated intermittently by the mechanism just described. This feed operates beneath a stack of blanks 59 held in a holder 61 positioned upon a shelf member 62 secured to the frame member 12 adjacent the turret 14. The feeding member 58 carries a cut out lug 63 adapted to release and feed into the turret the bottommost blank of the stack 59. The stack holder members are so arranged that the lowermost blank rests beneath them and may be pushed forward by the feeder to the holder 15 in the turret.

Figure 8:
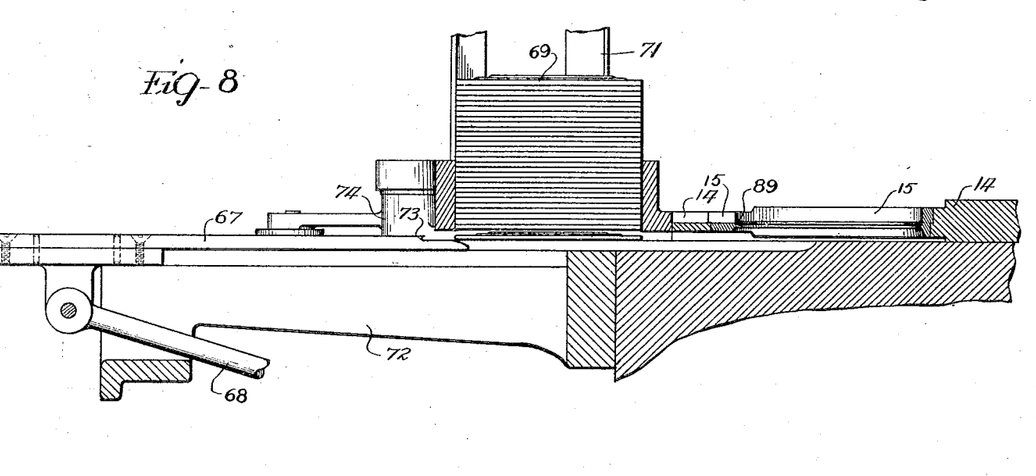
Fig. 8 is an enlarged section taken substantially on the line 8—8 of Fig. 6.

It will be noted that the arm 56 is connected by means of a connecting rod 64 with an arm 65 pivoted at 66 onto the frame member 12 at the opposite side of the machine and that this arm operates an end feed 67 to which it is secured by an adjustable connection 68, the arm 65 being pivotally secured to said connection. A stack of ends 69 is held in a holder 71 on a shelf member 72 and periodically the bottommost one, which is given clearance in a manner which may be understood by referring to Figs. 6 and 8, is fed into the turret. The lower part of the stack is held between gripping members 74 which carry fingers adapted to enter between the lowermost end and the one next above and which are moved to raise the stack slightly to free said lowermost end by means of toggle arms 75 having at their ends rollers 76 moving upon flared sides of the feeding slide 67 and in grooves 77. The ends are thus fed to the turret and into the lower part of the holders 15 in position to receive a gasket.

Figure 9:
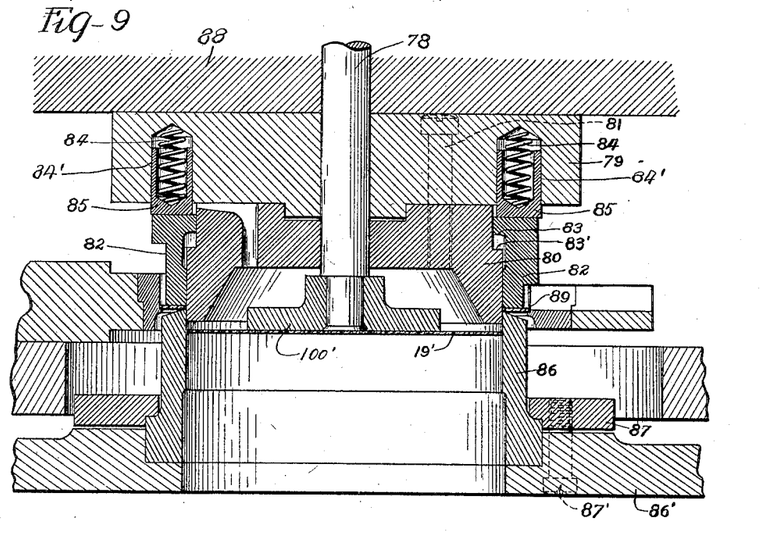
Fig. 9 is an enlarged section taken substantially on the line 9—9 of Fig. 6.

The means whereby the gaskets are cut from the blanks 21 and are seated in the can ends will now be described: As heretofore stated, the blank is fed in at the station 23 and seated upon a ledge 19 of one of the holders 15. The turret, continuing its intermittent movement, brings it to the station 24 where the liner is cut therefrom in the manner illustrated in Figs. 2 and 9. A rod 78 carries a head 100' having a cutting die 80 secured thereto by a set screw 81. An annular holding member 82 surrounds this die and has a shoulder 83 adapted to engage an oppositely facing shoulder 83' on the die 80 when the latter is moved upwardly. Springs 84 are positioned in apertures 84' in the head 79, and extend into hollow plugs 85 which have lower faces contacting with the upper face of the annulus 82. Thus, a yielding pressure is maintained upon this annulus when it is lowered.

A lower holding annulus 86, held within a supporting member 86' and restrained in its upward movement by a stop 87 secured to the member 86' by a screw 87', cooperates with the annulus 82 to hold the gasket 89 while the core 19' is cut out by the die 80. These holding parts 82 and 86 are carried on members 88 and 86' given reciprocating movement by crossheads 90 and 90'. The cores are forced from the turret into a chute 100 by a plunger 100' carried on the lower end of the rod 78. This plunger is actuated by means of an arm 110 controlled by a pawl 110' acting on a lug during the downward movement of the member 88. After the gasket is thus cut the die parts recede and the turret continues its intermittent rotation. At the station 26 an end is fed into the lower part of the holder 15 beneath the liner 89 (see Fig. 8).

Figure 5:
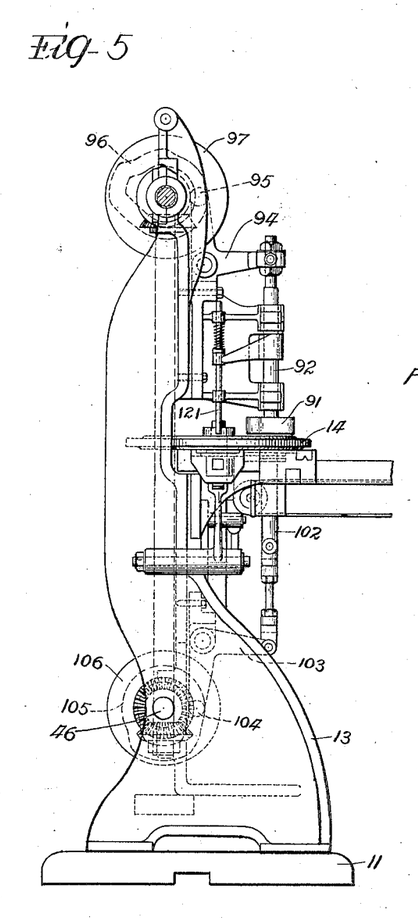
Fig. 5 is a side elevation of the machine.
Figure 10:
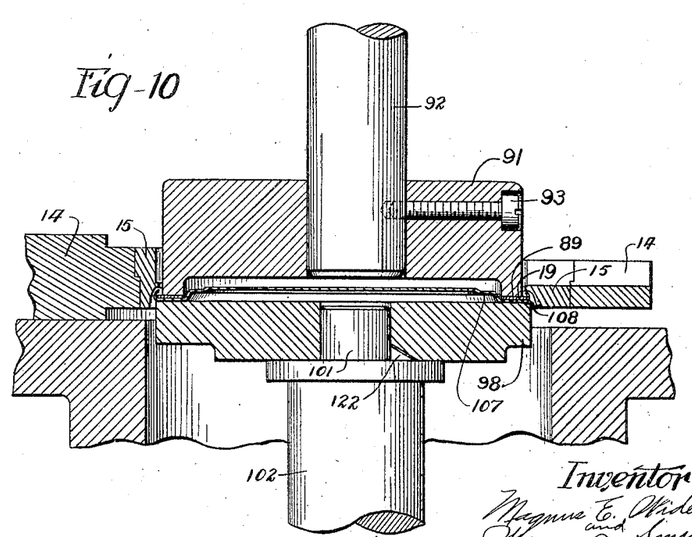
Fig. 10 is an enlarged section taken substantially on the line 10—10 of Fig. 6.

The next movement of the turret brings the holder to the station 27 where the liner is seated in the manner shown in Fig. 10 and by means particularly illustrated in Figs. 5 and 11. A seating die 91 is secured upon a rod 92 by a set screw 93 and is given reciprocating movement by a bell crank rocking lever 94 whose upper arm carries a roll 95 which rides in a cam groove 96 in a cam member 97 carried on the shaft 32. A base member 98 coacts with the die 91 and has an aperture 99 into which takes a stud 101 at the upper end of a rod 102, which is given reciprocating movement by a bell crank rocking lever 103 whose lever arm carries a roll 104 riding in a cam groove 105 in a cam member 106 carried on the shaft 46. As the member 98 is moved upwardly into position to support the can end 107 in the holder 15, the member 91 is moved downwardly within the holder, swiping the liner 89 past the ledge and onto the curled flange 108 of the can end.

When the members 91 and 98 move away the turret again turns bringing the lined end to the station 28, where it is ejected by means of a kick-out member 109 carried on a bracket arm 111 actuated by the movement of the rod 92, the ends falling onto a bolt conveyer 112 and carried from the machine.

It will be noted that we have provided a member 113 secured to a rod 114 which is operated vertically by means of a bell crank 115 on the upper end of which is a roll 116 moving in a cam slot 117 in a member 118 carried on the shaft 32, the purpose of which mechanism is to seat the paper blanks in the holders 15. We have also provided a rod 121 bracketed to the rod 92, the function of which is to hold the ends momentarily after they have been placed on the turret to prevent them being moved out of place by the retracting feed slide 67.

From the foregoing description it will be evident that we have provided a machine of great economy since the holder member 15 may be readily removed and replaced with another having an aperture of different size and shape, and the die members are also readily exchangeable, the member 98 being simply keyed to the stud 101 as shown at 122 and the other said members being secured in place by easily removable set screws, said members being irregular in shape with respect to engaging parts. Thus the same general mechanism may be used for lining can ends of varying sizes and shapes and is efficient and of simple construction.

It will be observed that the machine may be thrown out of operation by means of a handle 123 connected by a connecting rod 124 and a pivotal connection 125 to a clutch plate 126. Operating this handle causes the plate 126 to move to the left a second plate 127 which forces a pin 128 against the sleeve portion 30ª of the outside member 30 disengaging its arm portions 130 from the web 129 of the pulley wheel 31 and terminating the rotation of the shaft 32. We have also provided a hand wheel 131 for manual operation of the machine.

It is thought that the invention and many of its attendant advantages will be understood from the foregoing description, and it will be apparent that various changes may be made in the form, construction and arrangement of the parts without departing from the spirit and scope of the invention or sacrificing its material advantages, the form hereinbefore described being merely a preferred embodiment thereof.

We claim:

1. A machine for lining can ends with fiber gaskets, comprising an intermittently rotating turret, devices for feeding fiber blanks and can ends to said turret, and removable and replaceable holding parts having interior blank holding and gasket holding ledges, and corresponding die parts also removable for cutting gaskets of desired configuration and seating them in the flanges of the can ends.

2. A machine for lining can ends with fiber gaskets, comprising a rotating carrier turret, replaceable means having interior blank holding and gasket holding ledges carried in said turret for receiving and holding fiber blanks and can ends during the cutting and seating of the gasket liners in the flanges of said can ends, and coacting cutting and seating die members having replaceable operative parts whereby can ends of different shape or size may be lined by a single machine.

3. A machine for lining can ends with fiber gaskets, comprising a rotating turret, a plurality of replaceable holding members therein having interior blank holding and gasket holding ledges, devices for feeding paper blanks and can ends into said holding members at different stations and in timed relation, cooperating devices for cutting gaskets of predetermined configuration from said blanks, and devices coacting to seat said gasket in the flanges of said can ends, said holding members and cutting and seating devices being replaceable by others adapted to operate upon can ends of different size or shape.

4. A machine for lining can ends with fiber gaskets, comprising a rotating turret, a plurality of replaceable holding members therein, devices for feeding paper blanks and can ends into said holding members at different stations and in timed relation, cooperating devices for cutting gaskets of predetermined configuration from said blanks, devices coacting to seat said gaskets in the flanges of said can ends, and members moving with said gasket-seating devices for seating the paper blanks in said holding members and for temporarily holding the ends in position during the initial retracting movement of the end feed.

5. A machine for lining can ends with fiber gaskets, comprising in combination a rotating carrier turret, a plurality of replaceable holding members therein having blank holding and gasket holding ledges, coacting intermittent feeding devices for feeding blanks and can ends into said holding members, and reciprocating cutting and seating die members for cutting gaskets of desired configuration from said blanks and for seating them in the flanges of said can ends, said feeding devices being connected and acting simultaneously to cut out and feed from stacks of blanks and ends the lowermost ones thereof.

6. In a machine for lining can ends with fiber gaskets, a plurality of holding members having apertures of configuration similar to that of the ends to be lined and having a centrally located ledge extending continuously around the wall defining said aperture, said ledge being adapted to support said blank and the gaskets cut therefrom and to permit the removal of the formed gasket therefrom to the flange of the can end, and reciprocating die members for cutting and seatng said gasket, said holding and die members having parts replaceable to conform to the configuration of the ends to be lined.

7. In a machine for lining can ends with fiber gaskets, removable die parts comprising a holder having an aperture conforming in size and shape to the end to be lined, and having in the wall defining said aperture a ledge adapted to support a fiber blank, and reciprocating cutting and seating die members of the same configuration for positioning said gaskets upon the can ends, said holders and cutting and seating members being replaceable to permit the lining of ends of different configuration.

8. In an apparatus for lining flanged can ends with gaskets preparatory to applying them to flanged can bodies and interfolding the flanges to form a hermetic seal, the combination of instrumentalities for holding a gasket seating plunger and a seating plunger having working parts irregular in shape with respect to parts engaging said holding instrumentalities whereby to permit substitution of plungers of various shapes and sizes but having uniform engaging parts.

9. In an apparatus for lining flanged can ends with gaskets preparatory to applying them to flanged can bodies and interfolding the flanges to form a hermetic seal, the combination of a holder member for the gaskets and ends having a blank holding and gasket holding ledge, and a plunger having a working portion and an engaging portion by which it is secured in place, said working portion being irregular with respect to said engaging portion, and said engaging portion being removable whereby to permit substitution of plungers of various shapes and sizes but having uniform engaging portions.

10. In an apparatus for lining flanged can ends with gaskets preparatory to applying them to flanged can bodies and interfolding the flanges to form a hermetic seal, the combination of instrumentalities for holding gasket cutting members and gasket cutting members having working parts and engaging parts by which they are secured to said holding instrumentalities, said working parts being irregular with respect to said engaging parts, and said engaging parts being removable whereby to permit substitution of gasket cutting members of various shapes and sizes but having uniform engaging parts.

11. In an apparatus for lining flanged can ends with gaskets preparatory to applying them to flanged can bodies and interfolding the flanges to form a hermetic seal, the combination of a holder member for the gaskets and ends having a ledge to hold the paper blanks and gaskets, instrumentalities for holding gasket cutting members and gasket cutting members having working parts and engaging parts by which they are secured to said holding instrumentalities, said working parts being irregular with respect to said engaging parts, and said engaging parts being removable whereby to permit substitution of gasket cutting members of various shapes and sizes but having uniform engaging parts.

12. In an apparatus for lining flanged can ends with gaskets preparatory to applying them to flanged can bodies and interfolding the flanges to form a hermetic seal, the combination of a holder member for the gaskets and ends, having a ledge to hold the paper blanks and gaskets, said member being replaceable in said machine by others having similar engaging portions but varying gasket and end receiving portions, and devices for cutting and seating gaskets in said ends.

MAGNUS E. WIDELL.
WARREN A. SMITH.